US010485223B2

(12) United States Patent
Cull et al.

(10) Patent No.: US 10,485,223 B2
(45) Date of Patent: Nov. 26, 2019

(54) EGG INCUBATOR CONVERSION KIT

(71) Applicant: INCUBATION SYSTEMS, INC., Herrin, IL (US)

(72) Inventors: Thomas J. Cull, Herrin, IL (US); Ralph H. Hill, Christopher, IL (US)

(73) Assignee: Incubation Systems, Inc., Herrin, IL (US)

( * ) Notice: Subject to any disclaimer, the term of this patent is extended or adjusted under 35 U.S.C. 154(b) by 467 days.

(21) Appl. No.: 15/358,903

(22) Filed: Nov. 22, 2016

(65) Prior Publication Data

US 2017/0142939 A1 May 25, 2017

Related U.S. Application Data

(60) Provisional application No. 62/259,231, filed on Nov. 24, 2015.

(51) Int. Cl.
*A01K 41/00* (2006.01)
*A01K 41/02* (2006.01)

(52) U.S. Cl.
CPC .............. *A01K 41/00* (2013.01); *A01K 41/02* (2013.01)

(58) Field of Classification Search
CPC ...... A01K 41/00; A01K 41/02; A01K 41/023; A01K 41/026; A01K 41/04; F28F 1/30
USPC .................................................... 47/300–319
See application file for complete search history.

(56) References Cited

U.S. PATENT DOCUMENTS 2,026,801 A * 1/1936 Ross ..................... A01K 41/00 119/319
2,137,996 A 11/1938 Crawford
2,790,628 A * 4/1957 Barnes ..................... F28F 1/12 165/180
3,216,215 A * 11/1965 Schuett ................ A01K 41/023 137/116.3
3,690,370 A * 9/1972 Piper ..................... F24F 5/0007 165/219
3,731,732 A * 5/1973 Awe ........................ B21C 37/22 165/181
4,224,900 A * 9/1980 Truhan ................... A01K 31/18 119/448
6,182,608 B1 * 2/2001 Cannon .................. A01K 41/02 119/300
8,292,192 B1 10/2012 Purswell et al.
(Continued)

*Primary Examiner* — Tien Q Dinh
*Assistant Examiner* — Ebony E Evans
(74) *Attorney, Agent, or Firm* — Dureska & Moore, LLC; David P. Dureska; David J. Danko

(57) ABSTRACT

A kit for converting a multi-stage egg incubator to a single stage egg incubator. The single-stage egg incubator conversion kit includes an air intake system, an exhaust/ventilation system, a heating source, a cooling source, an environmental control system, and humidity system all being capable of incorporation into an egg incubator. Components of the air intake system, exhaust/ventilation system, heating source, cooling source, and humidity system are operatively connected to the environmental control system to provide environmental control within a setter of the egg incubator, including selective cooling capacity, selective heating capacity, selective air flow between the setter internal environment and an external environment, and selective air flow from the external environment into two or more zones within the setter internal environment.

12 Claims, 12 Drawing Sheets

(56) References Cited

U.S. PATENT DOCUMENTS

| | | | | |
|---|---|---|---|---|
| 9,566,672 | B2 * | 2/2017 | Kim | B23P 15/26 |
| 2002/0017571 | A1 * | 2/2002 | Riley | F04D 27/004<br>236/49.3 |

* cited by examiner

EGG INCUBATOR CONVERSION KIT

CROSS-REFERENCE TO RELATED APPLICATION

This application claims the benefit of U.S. Provisional Patent Application Ser. No. 62/259,231, filed Nov. 24, 2015.

BACKGROUND OF THE INVENTION

Technical Field

The invention relates generally to egg incubators. More particularly, the invention relates to converting a multi-stage egg incubator to a single-stage egg incubator.

Background

In one prior art multi-stage egg incubator a standard incubator setter typically holds about 95,000 eggs. The internal space of the setter typically includes six ages of eggs incubating at the same time. The older eggs produce heat, which can elevate the temperature of the younger eggs. Conversely, the younger eggs lower the temperature of the older eggs. The environmental conditions that are ideal for a two day old egg may be less than optimal for, and even harmful to a seventeen day old egg. Multi-stage incubators generally include an environmental control system which maintains an internal environment of the setter that will work for all the eggs regardless of their age, but is generally not optimum for all stages of egg development.

Due to scientific advancement in the understanding of egg embryo development in chickens, single-stage egg incubators are now often more desirable than multi-stage incubators. In a single-stage egg incubator, all of the eggs to be incubated are loaded into the incubator setter at the same time. Because all of the eggs in the setter are the same age, an operator has the ability to tailor the environment to provide an optimum setter environment for all eggs during each stage of development. For example, in the initial stage of embryo development, or endothermic stage of development, the embryos are incapable of creating sufficient heat to maintain proper development, and must rely on an external heat source. As such, heat must be provided to the eggs in order to maintain viability and promote egg development. Single-stage egg incubators typically include a heating source to maintain an internal temperature within the setter sufficient to support egg development. Because the eggs are all at the same stage of development, single-stage egg incubators typically allow the temperature of the setter to be maintained at a temperature optimum for all eggs during the endothermic stage of development.

As the embryos develop, the eggs become capable of producing heat sufficient to maintain development without an external heat source, often referred to as the exothermic stage of development. At a certain point in the exothermic stage of egg development, the embryos produce heat in excess of that optimum for development, which if uncontrolled, would allow the internal environment of the setter to reach a temperature too warm and could jeopardize proper development or viability. During the exothermic stage of development, cooling must be provided to the interior of the setter to maintain optimal temperature for development. Single-stage egg incubators typically include a cooling source which allows for such control. Once again, because all eggs are at a similar point in development, the temperature within the setter can be maintained at a temperature optimum for all eggs. Because single-stage egg incubators allow for tailored environmental control optimum for all stages of egg development, single-stage egg incubators typically provide chicks of overall improved quality upon hatching as compared to those incubated with a multi-stage egg incubator.

In order to obtain the benefits of single-stage egg incubators, the current practice requires hatcheries to remove existing multi-stage egg incubators and replace them with single-stage egg incubators. However, the cost of replacing a multi-stage incubator with a single-stage incubator is significant, as a single-stage incubator can be cost prohibitive.

In addition, prior art single-stage incubators and multi-stage egg incubators provide environmental control which is less than optimal. For example, prior art multi-stage and single-stage egg incubators typically have two heating zones within their setter interior, but only one cooling zone consisting of the entire incubator setter interior. More specifically, a single air intake duct typically feeds outside air over a cooling source mounted longitudinally within the interior of the incubator, which in turn provides cooling to the entire the incubator interior. In contrast, heating is typically controlled within two discrete zones, a front zone and a rear zone, by regulating temperature of discrete heating sources mounted in each zone. In certain circumstances, this setup can prove inefficient. For example, there could be a need for heating in one incubator zone and a simultaneous need for cooling in another incubator zone to maintain an optimal internal setter temperature for all embryos. In prior art multi-stage and single-stage egg incubators, because cooling is controlled simultaneously throughout the setter interior, in order to achieve cooling within the incubator front zone, the rear zone is also cooled. As a result, in order to heat the rear setter zone, the temperature of the heat source in the rear zone must be increased to overcome the cooling effect desired for the front zone. The competition between the heat source and cooling source under such circumstances results in increased energy consumption and operational costs to achieve the desired temperature equilibrium within the incubator setter.

Therefore, a need exists in the art for an economically advantageous alternative to replacing multi-stage egg incubators with single-stage incubators in order to obtain the benefits of the latter, as well as a single-stage egg incubator which provides improved environmental control with increased efficiency.

The disclosed subject matter satisfies these needs by providing a kit and method for converting a multi-stage egg incubator to a single stage egg incubator which eliminates the need to replace existing multi-stage egg incubators with single-stage egg incubators, thereby significantly decreasing the cost of obtaining the benefits of a single-stage egg incubator. In addition, the single-stage egg incubator conversion kit and method provide improved environmental control within the egg incubator, thereby providing the ability to optimize egg development.

BRIEF SUMMARY

The disclosed subject matter provides a kit and method for converting a multi-stage egg incubator to a single-stage incubator to experience the benefits of the later with significantly reduced costs. The disclosed subject matter provides a single-stage egg incubator with increased heating capacity and cooling capacity within the egg incubator setter over prior art multi-stage and single-stage egg incubators. The disclosed subject matter provides a single-stage egg incubator with increased environmental control within the egg incubator setter over prior art multi-stage and single-stage egg incubators.

These improvements and advantageous structures are obtained by the kit for converting a multi-stage egg incubator to a single-stage egg incubator, which includes an environmental control system, the environmental control system regulating an internal environment of a setter of an egg incubator, a cooling source, the cooling source being operatively connectable to the environmental control system and providing selective cooling capacity within the setter internal environment, a heating source, the heating source being operatively connectable to the environmental control system and providing selective heating capacity within the setter internal environment, an exhaust/ventilation system, the exhaust/ventilation system being operatively connectable to the environmental control system and providing selective air flow between the setter internal environment and an external environment of the egg incubator at least for controlling a carbon dioxide concentration within the setter internal environment; and an air intake system, the air intake system being operatively connectable to the environmental control system and providing selective air flow from the external environment into two or more zones within the setter internal environment at least for providing cooling to the two or more zones.

These improvements and resulting structures of the disclosed subject matter are also obtained by a method for converting a multi-stage egg incubator to a single-stage egg incubator which includes closing one or more existing exhaust ports of the multi-stage egg incubator, incorporating an exhaust/ventilation system into the multi-stage incubator, removing an existing air intake duct of the multi-stage egg incubator, incorporating a high capacity air intake system into the multi-stage egg incubator, incorporating a high capacity heating source into an existing heating system within the multi-stage egg incubator, removing one or more existing non-finned cooling coils from said multi-stage egg incubator, incorporating a high capacity cooling source into the multi-stage egg incubator; incorporating a secondary control system into the multi-stage egg incubator; removing an existing environmental control system of said multi-stage egg incubator; and incorporating an integrated environmental control system into the multi-stage egg incubator.

BRIEF DESCRIPTION OF THE DRAWINGS

The following description and drawings set forth certain illustrative aspects and implementations of the disclosed subject matter. These are indicative of but a few of the various ways in which one or more aspects or implementations may be employed. Aspects of the disclosed subject matter are set forth in the description and shown in the drawings. Further features of the disclosed subject matter will become apparent to those skilled in the art from reading the following description with reference to the accompanying drawings, in which.

Figure 1:
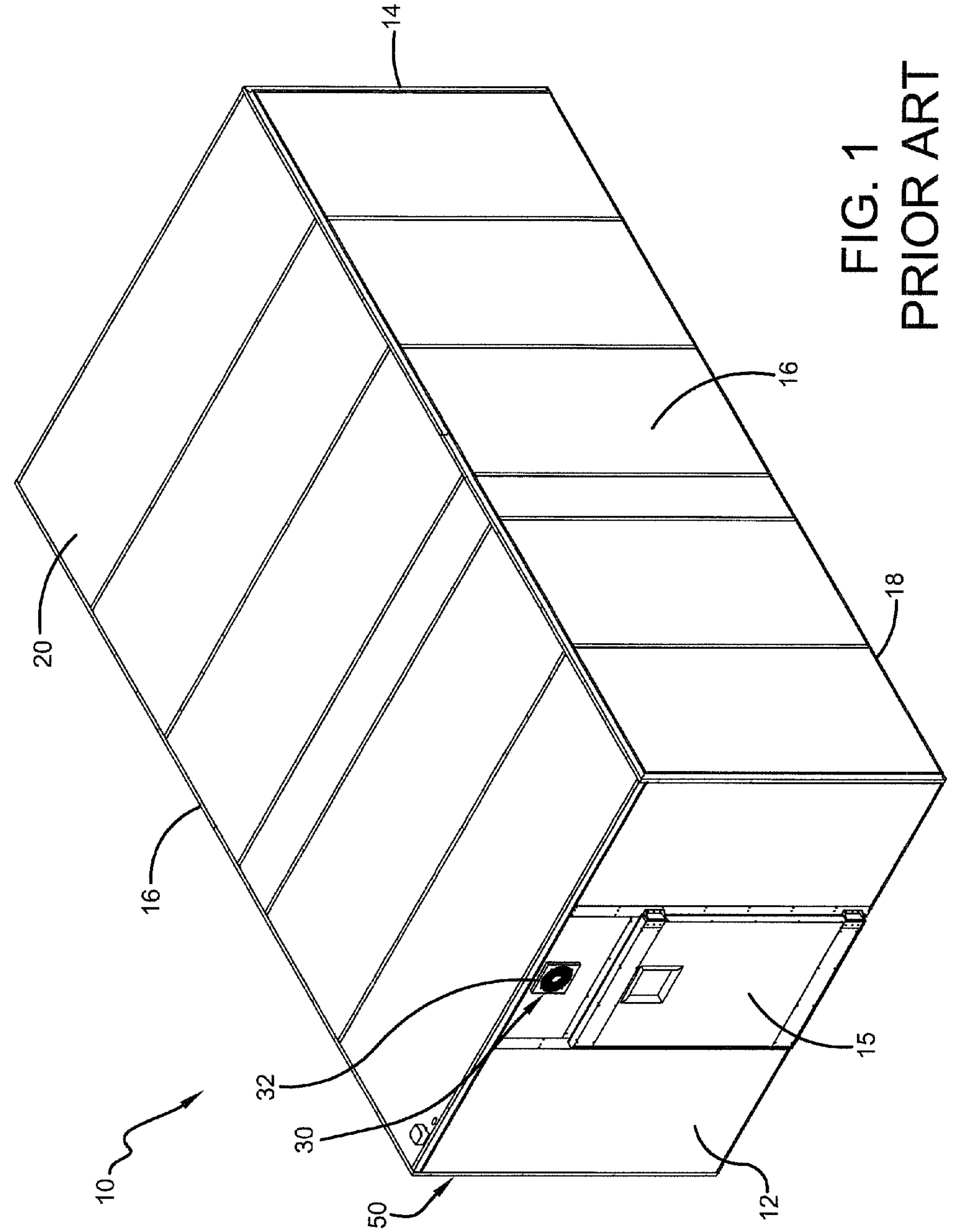
FIG. 1 is a perspective view of an exemplary prior art multi-stage egg incubator.

The disclosed subject matter is described with reference to the drawings, in which like reference numerals are used to refer to like elements throughout the description. For exemplary purposes, details are set forth in order to provide an understanding of the disclosed subject matter. It will be understood, however, that the disclosed subject matter can be practiced and implemented without these specific details.

DETAILED DESCRIPTION OF THE INVENTION

In order to better understand the structure and application of the concepts of the disclosed subject matter, the general structure of a prior art multi-stage egg incubator 10 (FIG. 1) prior to conversion to single-stage egg incubator 100 will now be described. The multi-stage egg incubator 10 includes a setter 50 which is generally rectangularly shaped. Setter 50 provides a housing in which eggs are placed during incubation. Setter 50 includes a front wall 12, a rear wall 14, a pair of sidewalls 16, a floor 18, and a top wall 20. Sidewalls 16 are situated parallel to one another on opposite sides of front wall 12 and rear wall 14. Front wall 12 includes an access door 15, which allows operators to enter into multi-stage egg incubator 10 through the front of the incubator to load eggs pre-incubation and unload eggs upon completion of the incubation period. Rear wall 14 may include an access door (not shown), which allows operators to enter into multi-stage egg incubator 10 through the rear of the incubator. Eggs are loaded upon trays (not shown), which are installed on a plurality of vertical brackets (not shown) longitudinally spaced along the interior surface of sidewalls 16 within setter 50.

Multi-stage egg incubator 10 includes an air intake system 30 for cooling the interior of setter 50. Air intake system 30 includes an air intake fan 32 which is mounted in front wall 12. Air intake fan 32 is in turn connected to an air intake duct (not shown) which extends along the interior surface of top wall 20 longitudinally within setter 50. The air intake duct is formed with a plurality of spaced apart and longitudinally aligned openings on its bottom surface which extend the length of the duct. Setter 50 of multi-stage egg incubator 10 includes an internal environmental control assembly (not shown) mounted longitudinally and centrally on the interior surface of top wall 20. The environmental control assembly generally includes a central air duct (not shown) suspended from the interior surface of top wall 20 and extending longitudinally within setter 50. The central air duct interfaces with the plurality of openings formed in the air intake duct. A plurality of fans (not shown) are attached to an internal central ventilation duct (not shown) and interface with the central air duct. The plurality of fans extend longitudinally along the internal central ventilation duct within setter 50. One or more of the fans includes a circular electric heating coil (not shown) installed on a bracket above the fan. Actuation of the circular electric heating coil and respective fan, provides heating to the interior environment of setter 50.

Cooling within the setter 50 is typically accomplished by a water cooling system (not shown) installed within the setter. More specifically, a plurality of copper pipes (not shown) extend longitudinally within the environmental control assembly central duct and are attached to the environmental control assembly by a series of brackets (not shown). The plurality of copper pipes are connected to an external water source. Water cooled by the external source, such as by an external water chiller (not shown), flows through the copper tubing. Air is drawn into the environmental control assembly duct by air intake fan 32 of air intake system 30, and is indirectly blown over the tubing to provide cooling to the interior of setter 50. Multi-stage egg incubator 10 includes one or more exhaust ports (not shown) disposed within top wall 20, which are utilized to expel air from the interior of setter 50 with undesired carbon dioxide concentrations produced by eggs during development, as is known in the art.

Having described the general structure of multi-stage egg incubator 10, prior to conversion to single-stage egg incubator 100, a single-stage egg incubator conversion kit 102 (FIG. 2) according to one aspect, and the systems and components thereof, will now be described in detail. When reference is made to single-stage egg incubator 100, it is to be understood that the single-stage egg incubator may have been a multi-stage egg incubator prior to conversion by single-stage egg incubator conversion kit 102 of the disclosed subject matter.

Single-stage egg incubator 100 is generally rectangularly shaped and includes a setter 150. Setter 150 provides a housing in which eggs are placed during incubation. Setter 150 includes a front wall 104, a rear wall 106, a pair of sidewalls 107, a floor 108, and a top wall 109. Sidewalls 107 are situated parallel to one another on opposite sides of front wall 104 and rear wall 106. Front wall 104 includes an access door 105, which allows operators to enter into single-stage egg incubator 100 through the front of the incubator to load eggs pre-incubation and unload eggs upon completion of the incubation period. Eggs are loaded upon trays (not shown) which are mounted on a plurality of vertical brackets 128 (FIG. 5) attached to the interior surface of sidewalls 107 within setter 150. Rear wall 106 can also include an access door (not shown) to allow operators to enter into single-stage egg incubator 100 through the rear of the incubator.

Single-stage egg incubator conversion kit 102 may include a high capacity air intake system 110, an exhaust/ventilation system 120, a high capacity heating source 130, a high capacity cooling source 180, an integrated environmental control system 200, and a multi-functional back plate 190 integrated into a multi-stage egg incubator, such as multi-stage egg incubator 10.

Figure 2:
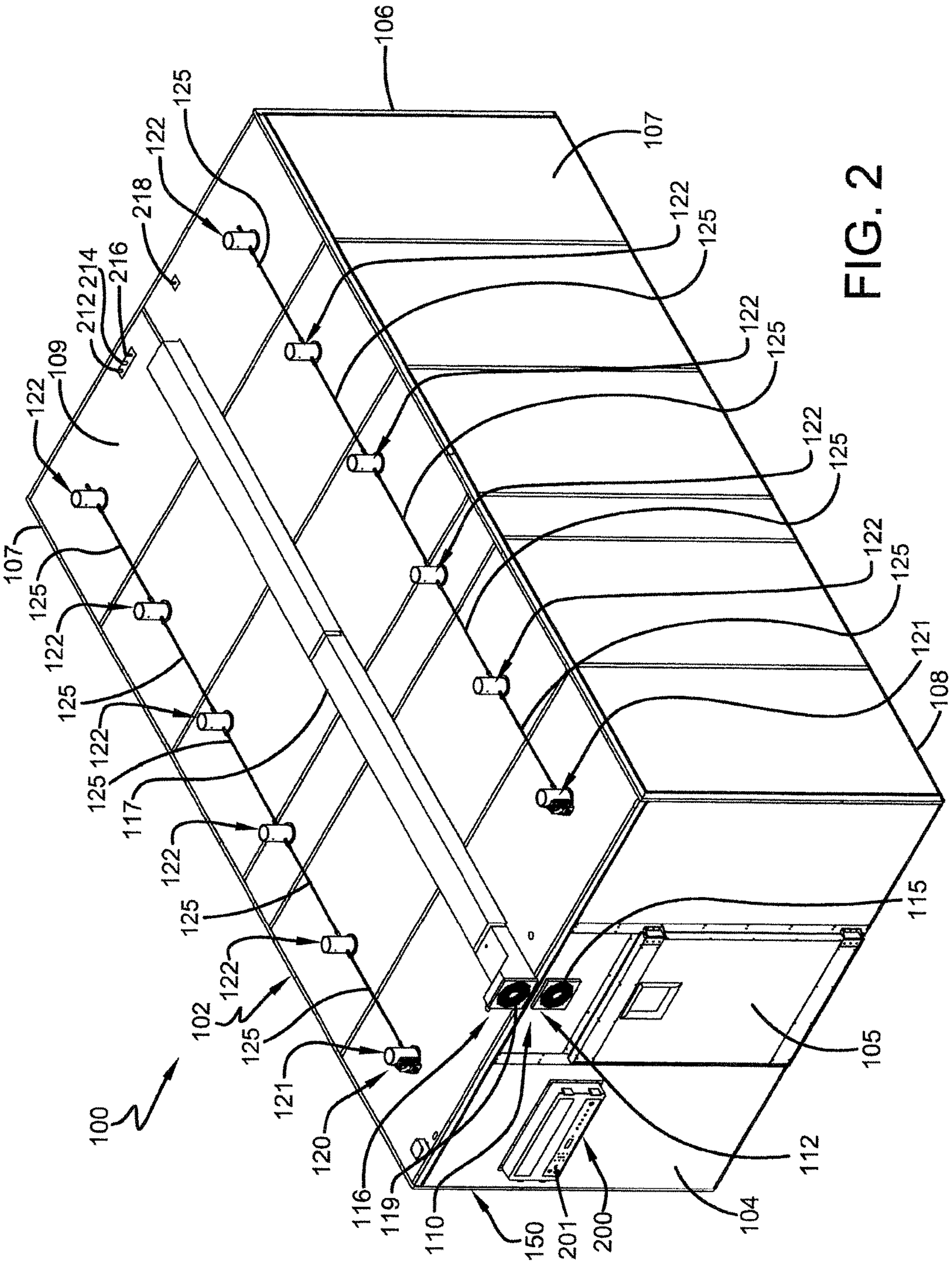
FIG. 2 is a perspective view of a single-stage egg incubator, converted from a multi-stage egg incubator by the single-stage egg incubator conversion kit according to one aspect and method.
Figure 3:
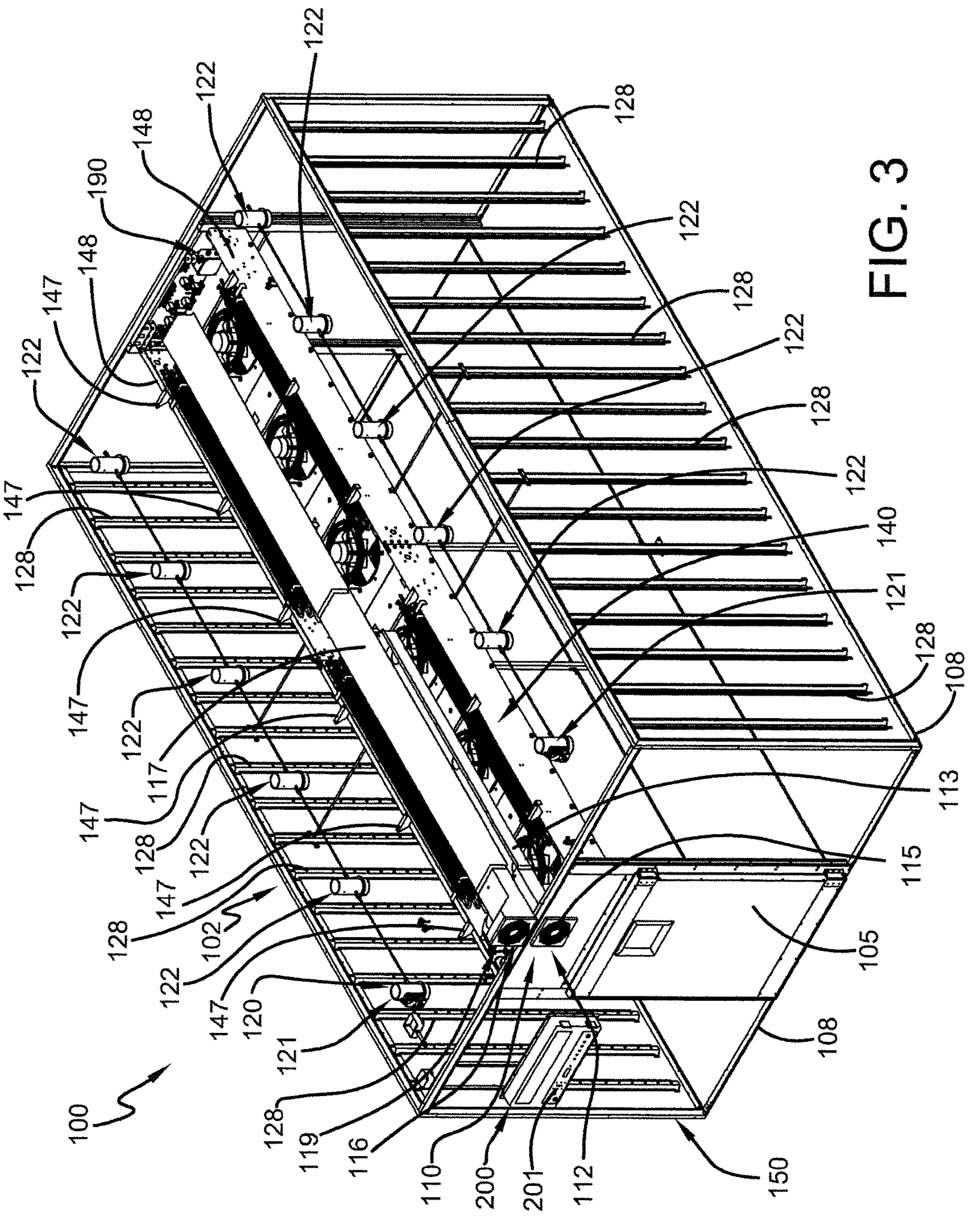
FIG. 3 is a perspective view of the converted single-stage egg incubator of FIG. 2, with the outside walls removed for clarity to show the interior of the incubator.
Figure 4:
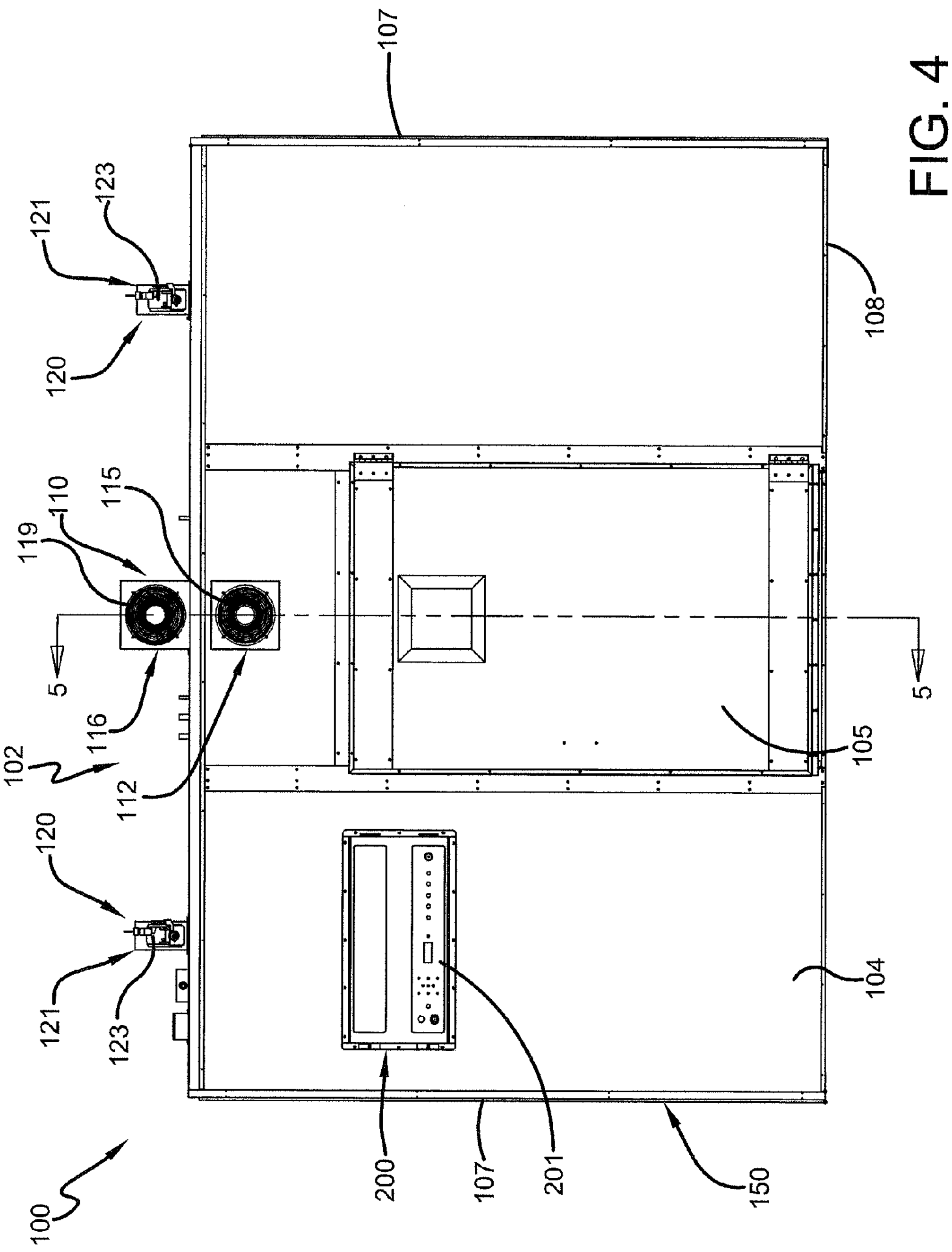
FIG. 4 is a front elevational view of the single-stage egg incubator of FIG. 2.
Figures 8, 9:
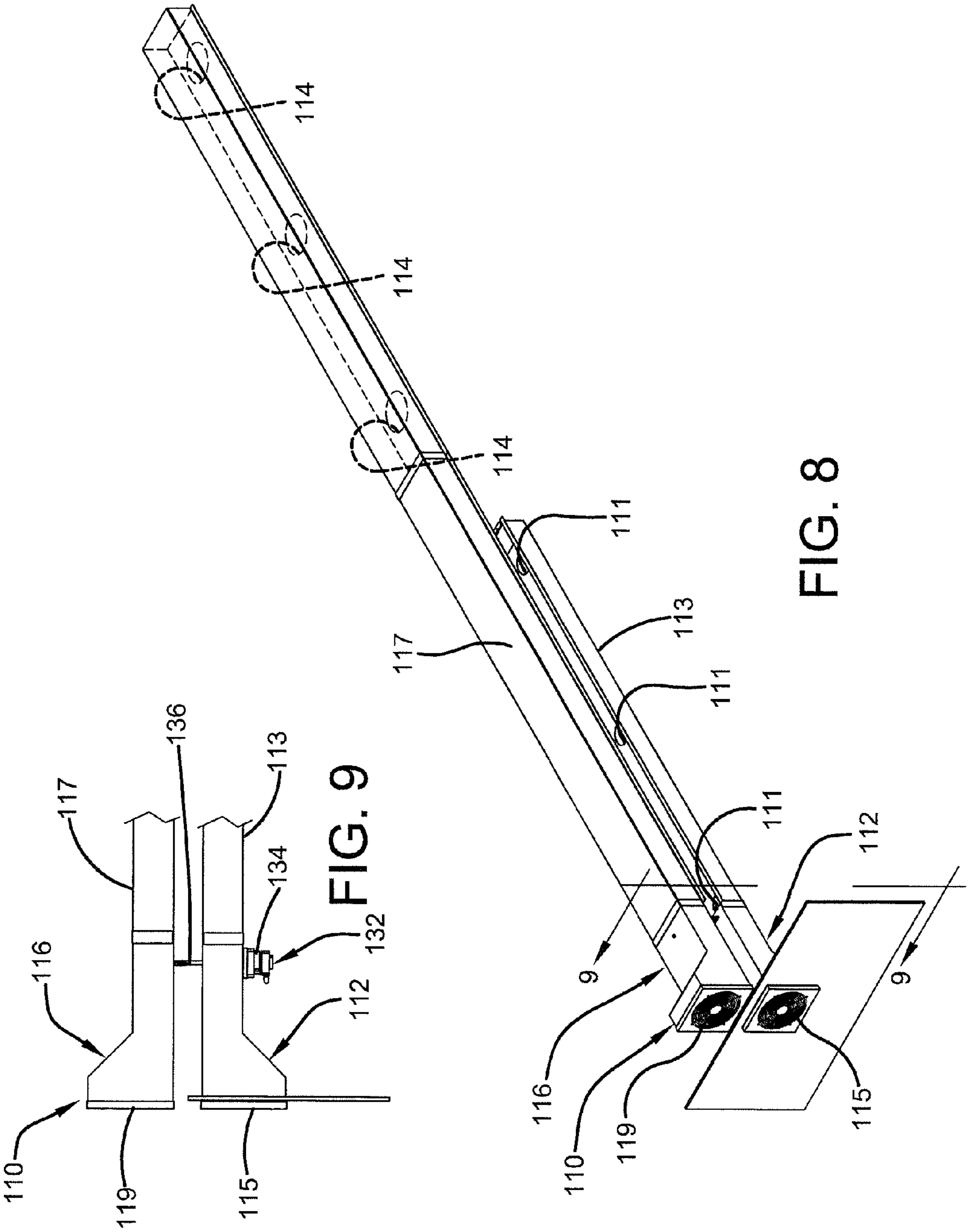
FIG. 8 is an enlarged perspective view of an air intake system of the split air cooling system of the conversion kit removed from the single-stage egg incubator of FIG. 2.
FIG. 9 is a side elevational view of a portion of the air intake system of FIG. 8, taken approximately along line 9-9 in FIG. 8.

Turning now to FIGS. 2 and 3, high capacity air intake system 110 is shown integrated into the converted single-stage egg incubator 100 with single-stage egg incubator conversion kit 102 of the disclosed subject matter. High capacity air intake system 110 is a split air intake system and may include a front zone air intake assembly 112 and a rear zone air intake assembly 116. As best shown in FIG. 8, front zone air intake assembly 112 includes an internal air intake duct 113. Internal air intake duct 113 is secured to structure of the interior surface of top wall 109 by any suitable means, such as brackets or fasteners, and extends longitudinally about half of the length of setter 150. Internal air intake duct 113 is formed with a plurality of openings 111 (FIG. 8) in the bottom surface of the internal air intake duct to allow the flow of air from the internal air intake duct into a front zone Q1 (FIG. 5) of the interior of setter 150. Front zone air intake assembly 112 includes an air intake fan 115 disposed within and attached to the front of internal air intake duct 113. Air intake fan 115 is operatively connected to integrated environmental control system 200, the importance of which will be described in detail below. Air intake fan 115 is in fluid communication with the external environment of single-stage egg incubator 100 and is capable of drawing external air through internal air intake duct 113 and into setter 150 upon actuation of the fan in response to a signal from integrated environmental control system 200.

Rear zone air intake assembly 116 includes an external air intake duct 117. External air intake duct 117 extends longitudinally across the top surface of top wall 109 and is secured to structure of the top wall by any suitable means, such as brackets or fasteners. External air intake duct 117 is formed with a plurality of openings 114 (FIG. 8) within the bottom surface of the external air intake duct rearward half, which correspond to a respective plurality of openings (not shown) formed within top wall 109 of setter 150 to allow the flow of air from the external air intake duct into a rear zone Q2 of the setter interior. Rear zone air intake assembly 116 includes an air intake fan 119 disposed within and attached to the front of external air intake duct 117. Air intake fan 119 is also operatively connected to integrated environmental control system 200. Air intake fan 119 is in fluid communication with the external environment of single-stage egg incubator 100 and is capable of drawing external air through external air intake duct 117 and into setter 150 upon actuation of the air intake fan.

In accordance with an important feature of single-stage egg incubator conversion kit 102, high capacity air intake system 110 provides the ability to provide independent air flow to front zone Q1 and/or rear zone Q2 of the internal environment of setter 150. Specifically, air intake fan 119 and air intake fan 115 can be selectively and independently actuated by an operator or integrated environmental control system 200. Because air intake fan 119 feeds external air into external air intake duct 117 and in turn rear zone Q2 and air intake fan 115 feeds external air into internal air intake duct 113 and in turn front zone Q1, external air can be directed into either the front zone or rear zone, or both the front zone and the rear zone, providing greater environmental control within the interior of setter 150 when compared to the prior art.

In accordance with an important feature of single-stage egg incubator conversion kit 102, and with reference to FIG. 9, high capacity air intake system 110 includes an electric damper assembly 132 which enables high capacity air intake system 110 to be sealed from the environment external to setter 150. Electric damper assembly 132 includes an electronic motor 134 secured to the bottom of internal air intake duct 113 by any suitable means, such as fasteners. A rectangular damper (not shown) is disposed within each of internal air intake duct 113 and external air intake duct 117. Each rectangular damper has a width and height slightly less than the width and height of the interior of internal space of internal air intake duct 113 and external air intake duct 117. Each rectangular damper is operatively connected to electronic motor 134 by a rod 136 disposed through a pair of vertically aligned openings (not shown) formed in the top and bottom of internal air intake duct 113 and the bottom of external air intake duct 117. Electronic motor 134 in turn is operatively connected to integrated environmental control system 200. Actuation of electronic motor 134 in response to a signal from integrated environmental control system 200 opens and closes the pair of dampers to either prevent or allow the passage of air into setter 150 through internal air intake duct 113 and external air intake duct 117, enabling internal air intake duct 113 and external air intake duct 117, to be sealed from the external environment. Alternatively, a motor can be secured to each of internal air intake duct 113 and external air intake duct 117, with each motor in turn being operatively attached to an individual damper within each of the internal and external air intake ducts to allow independent damping control to each air intake duct.

Figure 5:
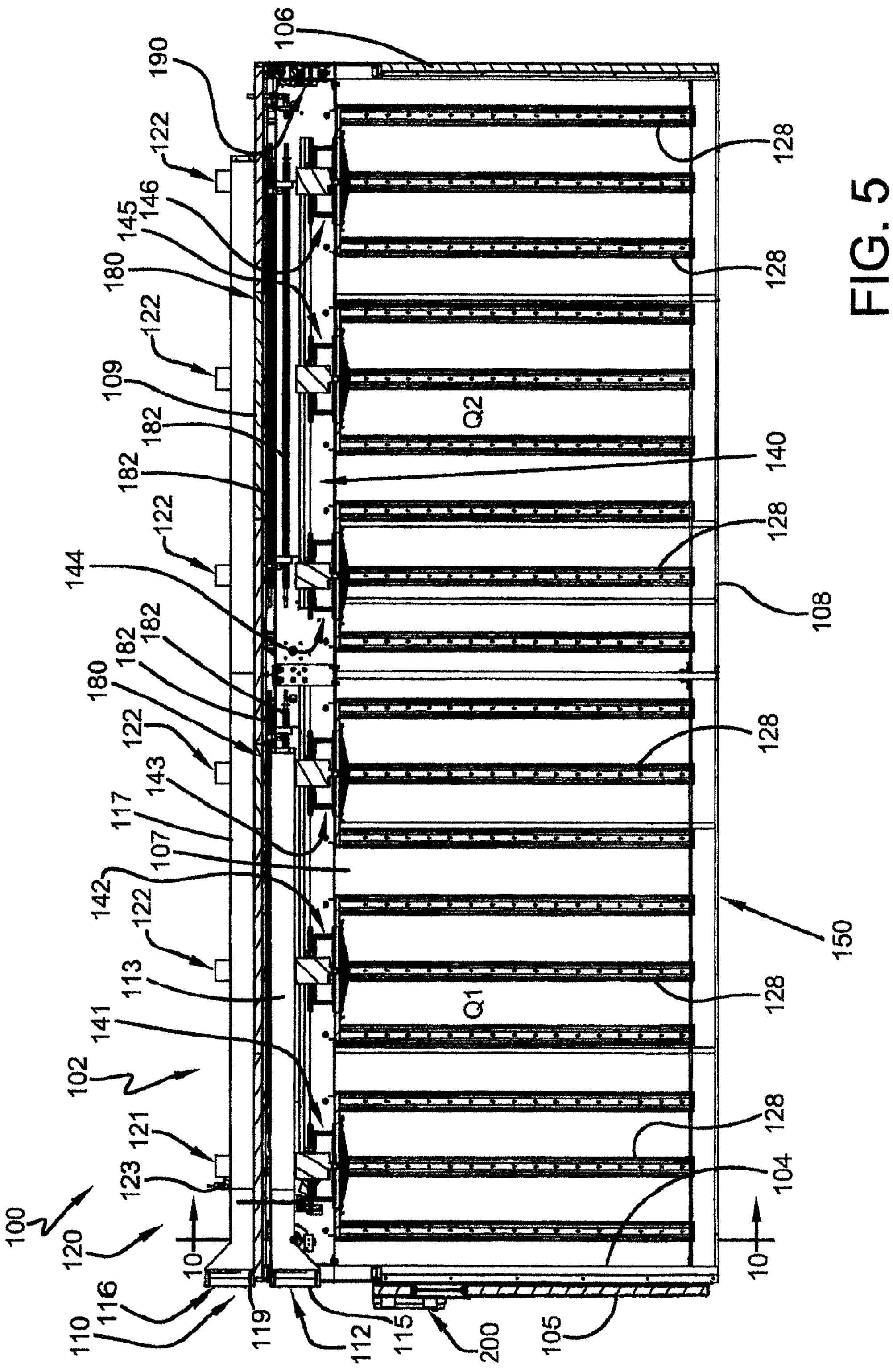
FIG. 5 is a longitudinal cross-sectional view of the single-stage egg incubator shown in FIG. 2, taken approximately along line 5-5 in FIG. 4.
Figure 6:
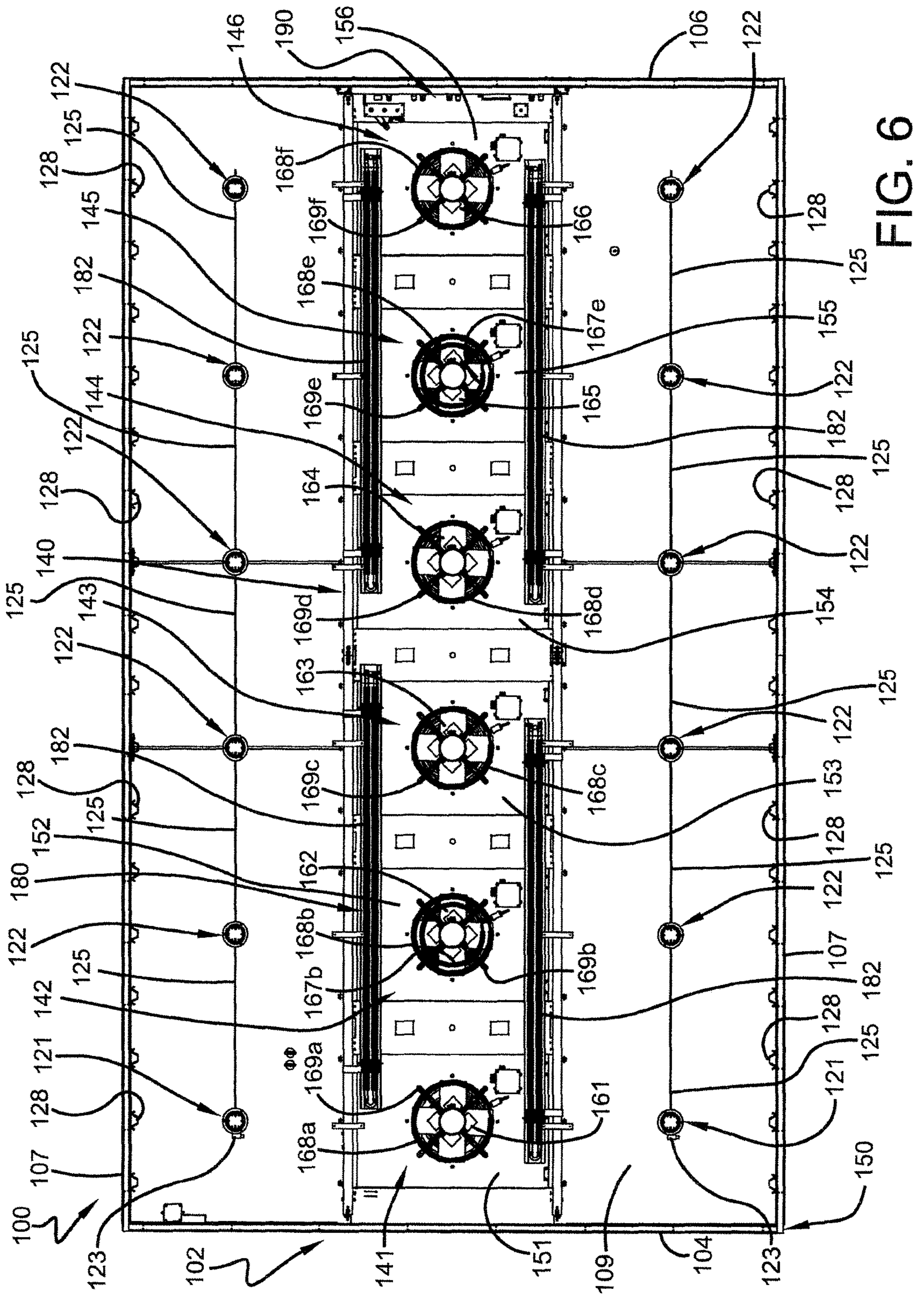
FIG. 6 is a top plan view of the single-stage egg incubator of FIG. 2 with the external air intake duct removed and the top wall shown as transparent, showing the orientation of components of the conversion kit attached to, or extending from, the top wall.

With reference to FIGS. 3 and 5-6, single-stage egg incubator 100 includes a central ventilation duct 140. Central ventilation duct 140 has a pair of main beams 148. Main beams 148 are attached to the interior surface of top wall 109 and extend longitudinally parallel opposite to one another the entire length of setter 150. Central ventilation duct 140 also includes a plurality of transverse mounting brackets 147 which are used to attach components of high capacity cooling source 180, as will be described below.

Figure 7:
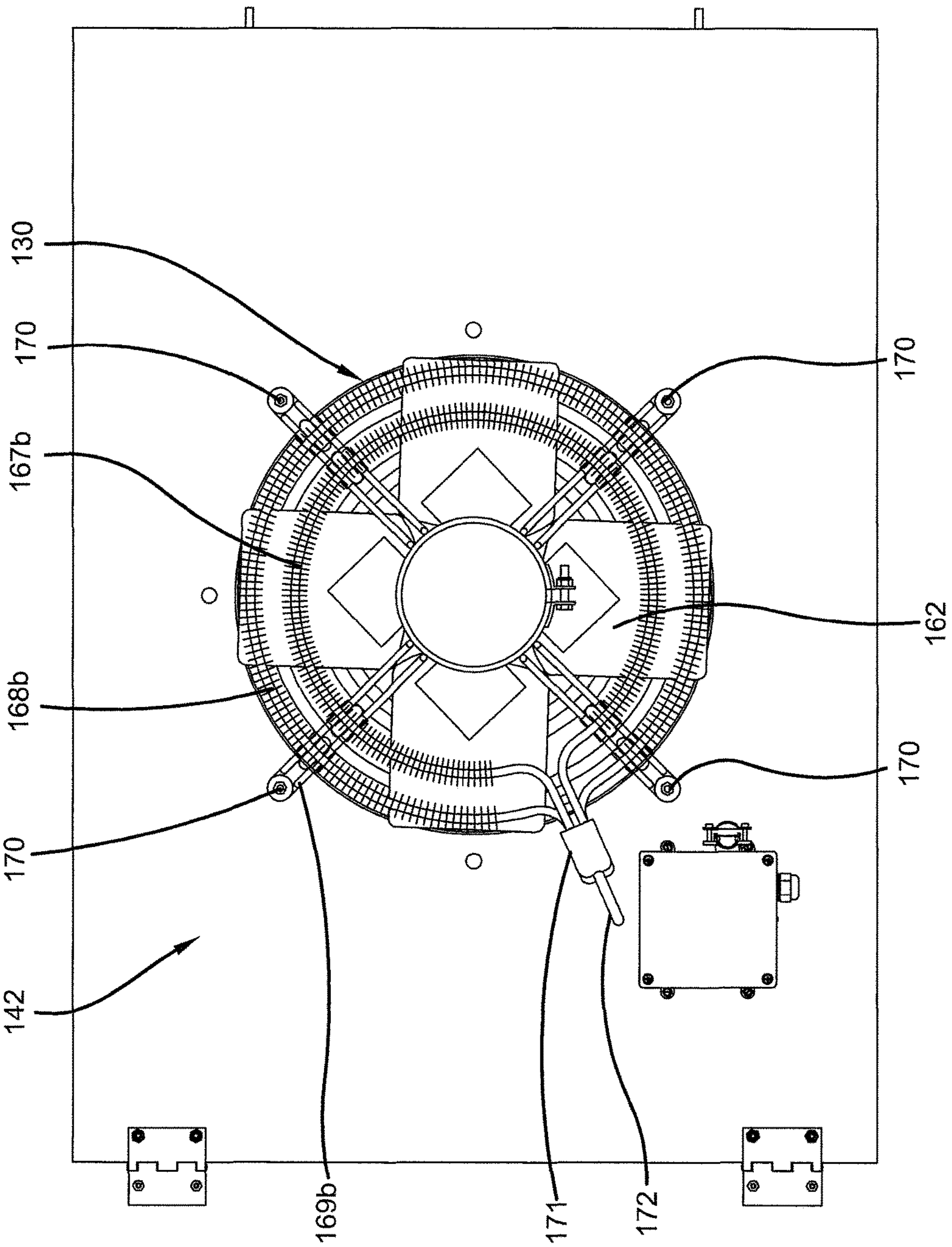
FIG. 7 is an enlarged top plan view of a fan panel from the single-stage egg incubator of FIG. 2, showing the fan panel with a pair of heating coils of the conversion kit attached to the fan panel bracket assembly.

With specific reference to FIG. 6, central ventilation duct 140 includes six fan assemblies 141, 142, 143, 144, 145, 146 mounted between main beams 148. With reference to FIGS. 6-7, fan assemblies 141, 142 and 143 are located in front zone Q1 of setter 150 and are in fluid communication with internal air intake duct 113 of front zone air intake assembly 112 through plurality of openings 111 formed within the bottom surface of the internal air intake duct, one of each openings being located above a respective fan. Fan assemblies 144, 145 and 146 in turn are located in rear zone Q2 of setter 150 and are in fluid communication with external air intake duct 117 of rear zone air intake assembly 116 through plurality of openings 114 formed within the bottom surface of the external air intake duct and the respective plurality of openings (not shown) formed within top wall 109, a pair of each openings being located above a respective fan. A divider wall (not shown) may be attached to and extend between main beams 148 between fan assemblies 141,142,143 and 144,145,146 to divide central ventilation duct 140 into two separate zones, with a first zone including fan assemblies 141,142 and 143 and a second zone including fan assemblies 144,145 and 146.

Each fan assembly 141,142,143,144,145 and 146 includes a fan panel 151,152,153,154,155 and 156 respectively. Each fan assembly 141,142,143,144,145 and 146 also includes a blower fan 161,162,163,164,165 and 166, respectively. Each of blower fans 161-166 is disposed through and mounted within an opening formed in their respective fan assembly 141-146. Each of blower fans 161-166 includes a motor (not shown) operatively connected to integrated environmental control system 200. Blower fans 161-166 can be operatively connected to integrated environmental control system 200 individually, or in controllable sets. For example, Fans 161, 163 and 165 could comprise a first controllable set and fans 162, 164 and 166 a second controllable set. Alternatively, fans 161, 162 and 163 could comprise a first controllable set, and fans 164, 165 and 166 a second controllable set. For purposes of conciseness, only the operation of fan assembly 141 will be described below, with the understanding that fan assemblies 142-146 operate similarly.

With reference to FIG. 6, high capacity heating source 130 includes a plurality of electric heating coils 168*a*-168*f*. More specifically, each of electric heating coils 168*a*-168*f* is mounted above a respective blower fan 161-166 via a respective bracket assembly 169*a*-169*f*. Each bracket assembly 169*a*-169*f* is secured to its respective fan panel 151-156 with a plurality of fasteners 170. Electric heating coils 168*a*-168*f* are finned to increase the surface area of heat exchange between the coils and the internal environment of setter 150. Electric heating coils 168*a*-168*f* are operatively connected to integrated environmental control system 200. As electricity is provided to electric heating coils 168*a*-168*f* fans, the coils heat the surrounding air, which in turn can be drawn into the interior of setter 150 by actuation of fans 161-166.

In accordance with an important feature of the egg incubator conversion kit of the disclosed subject matter, high capacity heating source 130 of single-stage egg incubator conversion kit 102 may increase heating capacity within setter 150. Specifically, and with reference to FIG. 6, high capacity heating source 130 includes a supplemental or second electric heating coil 167*b* and 167*e* integrated into fan assemblies 142 and 145, respectively. For purposes of conciseness, only second electric heating coil 167*b* (FIG. 7) will be described in detail with the understanding that second electric heating coil 167*e* is similar in structure and function. As is best shown in FIG. 7, second electric heating coil 167*b* has a smaller diameter than electric heating coil 168*b*. Second electric heating coil 167*b* is attached to bracket assembly 169*b* so that is positioned concentrically within the outside diameter of electric heating coil 168*b*. Second electric heating coil 167*b* is finned to increase the surface area for heat transfer between the electric heating coil and the internal environment of setter 150. Electric heating coils 168*b* and second electric heating coil 167*b* are operatively combined via a union 171, and are in turn operatively connected to environmental control system 200 by a wire 172. Each electric heating coil 168*a*, 168*c*, 168*d* and 168*f*, or combined electric heating coils and second electric heating coils 168*b*,167*b* and 168*e*,167*e*, can be can be operatively connected to integrated environmental control system 200 individually, or in controllable sets. For example, electric heating coils 168*a* and 168*c* and combined electric heating coils and second electric heating coils 168*b*, 167*b* could comprise a first controllable set, and electric heating coils 168*d* and 168*f* and combined electric heating coils and second electric heating coils 168*e*,167*e* a second controllable set. Because second electric heating coil 167*b* and 167*e* are integrated into fan assemblies 142 and 145, which are located in front zone Q1 and rear zone Q2 of setter 150, respectively, high capacity heating source 130 provides single-stage egg incubator 100 with increased heating capacity and improved temperature control over the prior art for eggs incubated within setter 150 during the endothermic stage of development.

Additional second heating coils could be included with high capacity heating source 130 and could be installed on bracket assembly 169*a*, 169*c*, 169*d*, and/or 169*f* to further increase heating capacity within setter 150. In addition, a third heating coil (not shown) in addition to second heating coils, such as second electric heating coils 167*b* and 167*e*, could be installed on one or more of the bracket assemblies 169*a*-169*f* to further increase the heating capacity within setter 150 by high capacity heating source 130. In addition, high capacity heating source 130 could include one or more finned copper heating pipes (not shown) installed within setter 150 through which water heated by an external source flows to provide increased heating capacity within the setter.

Figure 11:
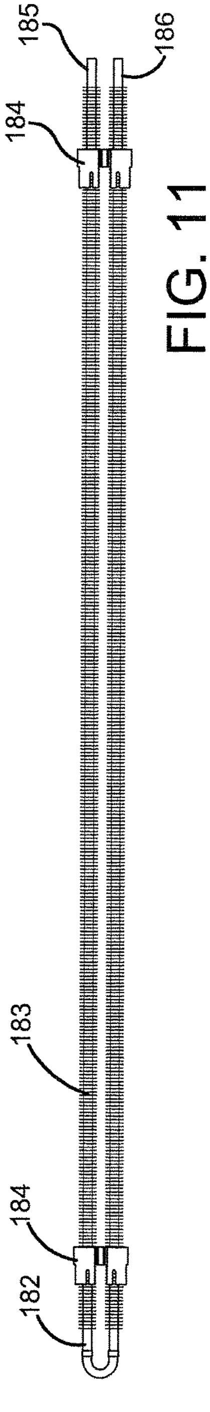
FIG. 11 is top plan view of a finned water cooling coil of the single-stage egg incubator conversion kit of the disclosed subject matter.
Figure 12:
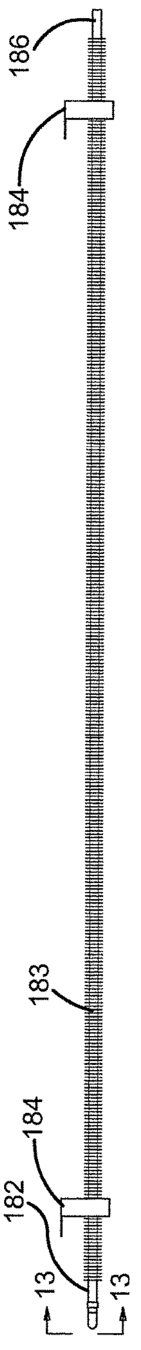
FIG. 12 is a side elevational view of the finned water cooling coil of FIG. 11, showing the orientation of the coil within a pair of mounting brackets.
Figure 13:
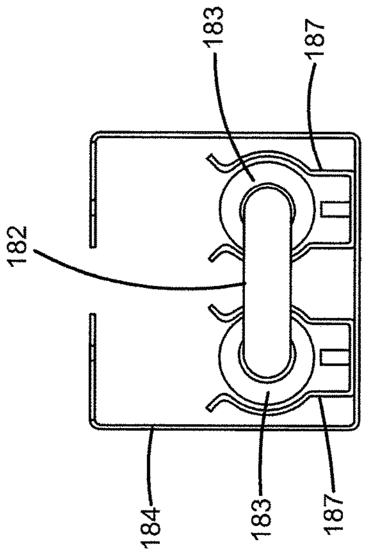
FIG. 13 is a front elevational view of the finned water cooling coil of FIG. 12 taken along line 13-13 in FIG. 12.

With reference to FIGS. 2 and 6, high capacity cooling source 180 of single-stage egg incubator conversion kit 102 of the disclosed subject matter includes four pairs of cooling coils 182. Each of cooling coils 182 includes an influent end 185 and an effluent end 186. Each influent end 185 and effluent end 186 of cooling coil 182 are operatively connected to multi-functional back plate 190, and to a source of cooling fluid. With reference to FIGS. 11-13, each cooling coil 182 is attached to plurality of transverse mounting brackets 147 of central ventilation duct 140 with a plurality of coil brackets 184 by any suitable means, such as fasteners (not shown). More specifically, each cooling coil 182 is disposed through two or more coil brackets 184 and secured thereto by a bracket clip 187 formed within each bracket. Bracket clips 187 are in turn are attached to two or more respective transverse mounting brackets 147.

In accordance with an important aspect of single-stage egg incubator conversion kit 102, two pairs of cooling coils 182 are attached to the inside surface of each of main beams 148 of central ventilation duct 140. In prior art multi-stage egg incubators, such as incubator 10 shown in FIG. 1, only a single cooling coil (not shown) is typically installed on each side of an internal central ventilation duct (not shown) in a front zone (not shown) and single cooling coil is installed on each side of the internal central ventilation duct in a rear zone (not shown), totaling four cooling coils installed within the multi-stage egg incubator. In contrast, by including two pairs of cooling coils 182 attached within central ventilation duct 140 adjacent to each main beam 148 in both front zone Q1 and rear zone Q2, single-stage egg incubator 100 has a total of eight cooling coils, which significantly increases cooling capacity within setter 150 and provides improved temperature control for eggs incubated within the setter during the exothermic stage of development.

In accordance with another important aspect of single-stage egg incubator conversion kit 102 of the disclosed subject matter, and with continued reference to FIGS. 11-13, each cooling coil 182 includes a plurality of fins 183. Plurality of fins 183 increase the surface area for cooling exchange between cooling coils 182 and setter 150 when cooling is required. In operation, water cooled from an external source, such as an external water chiller, may flow through each cooling coil 182 influent end 185 and out through effluent end 186. As the cooled water flows through cooling coil 182, because the internal air temp of setter 150 is generally much warmer than the temperature of the water flowing through the coil, a cooling effect within setter 150 is achieved. In addition, increased cooling is provided to setter 150 when high capacity air intake system 110 is utilized in conjunction with high capacity cooling source 180. Specifically, as air is drawn in by high capacity air intake system 110 and forced into setter 150 through central ventilation duct 140, the air is cooled as is passes over cooling coils 182, which in turn cools the interior of the setter as cooled air is forced past blower fans 161-166 of fan assemblies 141-146 and into the setter. Fans 161-166 can also be actuated to draw cooled air from central ventilation duct 140 into the interior of setter 150.

Figure 15:
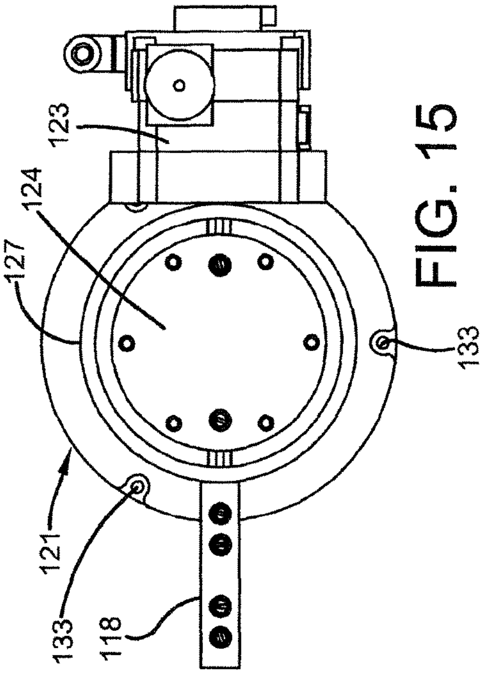
FIG. 15 is a top plan view of the control exhaust damper of FIG. 14.
Figure 14:
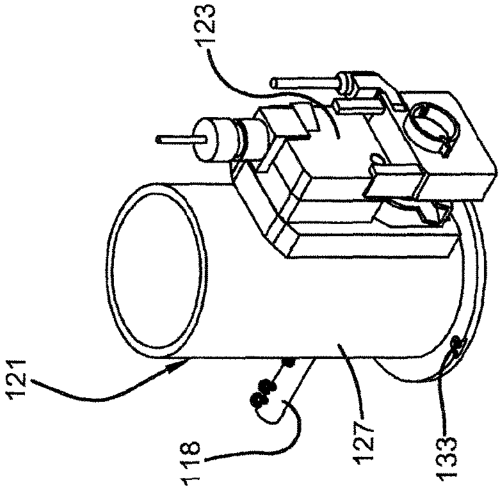
FIG. 14 is an enlarged perspective view of a control exhaust damper of the single-stage egg incubator conversion kit.

With reference to FIGS. 2 and 14-15, exhaust/ventilation system 120 of single-stage egg conversion kit includes a pair of control exhaust dampers 121. With reference to FIGS. 14-15, each control exhaust damper 121 includes a cylindrical body 127. Cylindrical body 127 has a hollow interior and is formed with a pair of horizontal longitudinally aligned openings (not shown). An electronic motor 123 is attached to cylindrical body 127 and is in turn operatively connected to a damper plate 124 disposed within the hollow interior of cylindrical body 127 through a first one of the pair of horizontal longitudinally aligned openings. With specific reference to FIG. 15, damper plate 124 is round with a diameter slightly smaller than the diameter of the hollow interior of cylindrical body 127. Damper plate 124 is in turn connected to a fitting 118 through a second one of the pair of horizontally aligned openings formed in cylindrical body 127. Each cylindrical body 127 of control exhaust dampers 121 is attached to the outside surface of single-stage egg incubator 100 top wall 109 by a plurality of fasteners disposed through a respective plurality of openings 133 formed within the cylindrical body. Control exhaust dampers 121 are transversely spaced on top wall 109 of single-stage egg incubator 100 near the front of the top wall above a respective opening (not shown) formed within the top wall, which allows fluid communication between the interior of setter 150 and the external environment, as will be described in detail below. Each control exhaust damper 121 may include a gasket (not shown) disposed between cylindrical body 127 and top wall 109 to provide increased sealing between the cylindrical body and the top wall.

Figure 16:
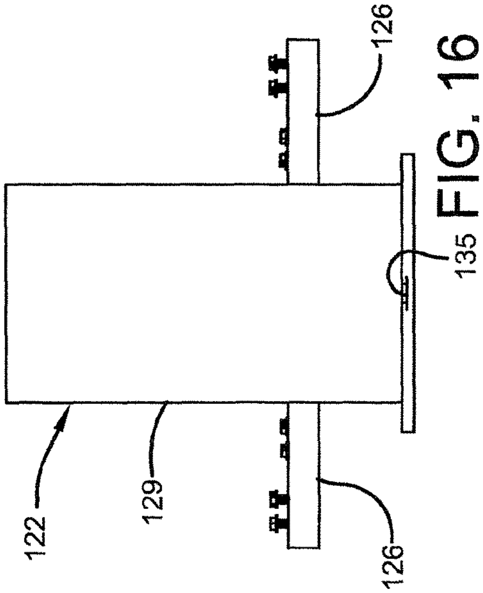
FIG. 16 is an enlarged side elevational view of a subordinate exhaust damper of the single-stage egg incubator conversion kit of the disclosed subject matter.

With reference to FIGS. 2 and 16, exhaust/ventilation system 120 also includes ten subordinate exhaust dampers 122. Five subordinate exhaust dampers 122 are longitudinally positioned behind each control exhaust damper 121 at intervals along the top surface of single-stage egg incubator 100 top wall 109. Subordinate exhaust dampers 122 are similar in structure and function to control exhaust dampers 121 with the exception that they lack a motor. As such, each subordinate exhaust damper 122 includes a cylindrical body 129. Each cylindrical body 129 is attached to the outside surface of single-stage egg incubator 100 top wall 109 by a plurality of fasteners (not shown) disposed through a respective plurality of openings 135 formed within the cylindrical body. Subordinate exhaust dampers 122 are attached to top wall 109 of single-stage egg incubator 100 above a respective opening (not shown) formed within the top wall. Each subordinate exhaust damper 122 may include a gasket (not shown) disposed between cylindrical body 129 and top wall 109 to provide increased sealing between the cylindrical body and the top wall. Cylindrical body 129 has a hollow interior and is formed with a pair of horizontal longitudinally aligned openings (not shown). A damper plate (not shown) is disposed within the hollow interior of cylindrical body 129. Each subordinate exhaust damper 122 includes a pair of fittings 126 attached to the damper plate. Pair of fittings 126 extend longitudinally frontwardly and longitudinally rearwardly through a respective one of a pair of horizontal longitudinally aligned openings (not shown) formed in cylindrical body 129.

Each fitting 126 of subordinate exhaust damper 122 is utilized to link the subordinate exhaust damper to either a fitting 126 a subsequent longitudinally mounted subordinate exhaust damper, or fitting 118 of a respective control exhaust damper 121. More specifically, and with particular reference to FIGS. 2 and 6, a rod 125 is disposed within and is mechanically attached to the respective fittings 126 of subsequent longitudinally mounted subordinate exhaust dampers 122. A rod 125 is also disposed between and mechanically attached to fitting 126 of the subordinate exhaust damper longitudinally adjacent to control exhaust damper 121 and fitting 118 of the control exhaust damper. Actuation of electronic motor 123 of control exhaust damper 121 in response to a signal from environmental control system 200 causes damper plate 124 to rotate about its connection to the motor to open or close the hollow interior of cylindrical body 127. Because subsequent subordinate exhaust dampers 122 are ultimately linked to damper plate 124 via fittings 118 and fittings 126, the damper plate of each subordinate exhaust damper 122 also rotates to open or close.

In accordance with an important aspect of single-stage egg incubator conversion kit 102 of the disclosed subject matter, exhaust/ventilation system 120, when utilized in conjunction with electric damper assembly 132 of high capacity air intake system, allows an operator to selective seal the interior of setter 150 from the external environment of single-stage egg incubator 100.

During operation of single-stage egg incubator 100 in the first seven days of egg development, it is desirable to increase the carbon dioxide level within setter 150 to provide an environment optimum for egg development. Control exhaust dampers 121 and linked subordinate exhaust dampers 122 allow an operator or integrated environmental control system 200 to electronically close all of the exhaust dampers, and when electric damper assembly 132 is also actuated to seal off internal air intake duct 113 and external air intake duct 117, to seal off the interior environment of setter 150, allowing the concentration of carbon dioxide within the setter to increase in order to achieve the desired carbon dioxide level during the initial stage of egg development. After the initial period of development, when a lower carbon dioxide concentration is desired within setter 150, an operator or integrated environmental control system 200 can electronically open control exhaust dampers 121 and subordinate exhaust dampers 122, and internal air intake duct 113 and/or external air intake duct 117 to allow carbon dioxide levels within the setter to decrease and oxygen levels to increase to an optimum level for the particular stage of egg development. More than two control exhaust dampers 121 and more or less than ten subordinate exhaust dampers 122 could be installed on top wall 109 to achieve the desired control over oxygen and carbon dioxide levels within setter 150.

Additionally, sealing off the interior environment of setter 150 increases the efficiency of high capacity heating source 130 during the endothermic stage of egg development by minimizing heated air from escaping from the setter and thus reducing the work required by the heating source to maintain the setter internal environment at a temperature optimum for the particular stage of development.

In accordance with another important aspect of single-stage egg incubator conversion kit 102, exhaust/ventilation system 120 greatly reduces or eliminates the potential for formation of hot spots within setter 150. In prior art single-stage and multi-stage egg incubators, such as multi-stage egg incubator 10, hot spots, or pockets of air of increased temperature compared to the surrounding air, can potentially form within the setter interior. Specifically, because the single-stage and multi-stage egg incubators generally include only a single exhaust port, a backup of heated air accumulates around the exhaust port while waiting to be expelled when cooling is desired. Because each control exhaust damper 121 and linked subordinate exhaust dampers 122 are distributed evenly longitudinally across top wall 109, excess heat within the interior of setter 150 can be expelled quickly and evenly through the control exhaust dampers and subordinate exhaust dampers. This eliminates a backup of heated air within the interior of setter 150, thus providing increased environmental control within setter 150.

Figure 10:
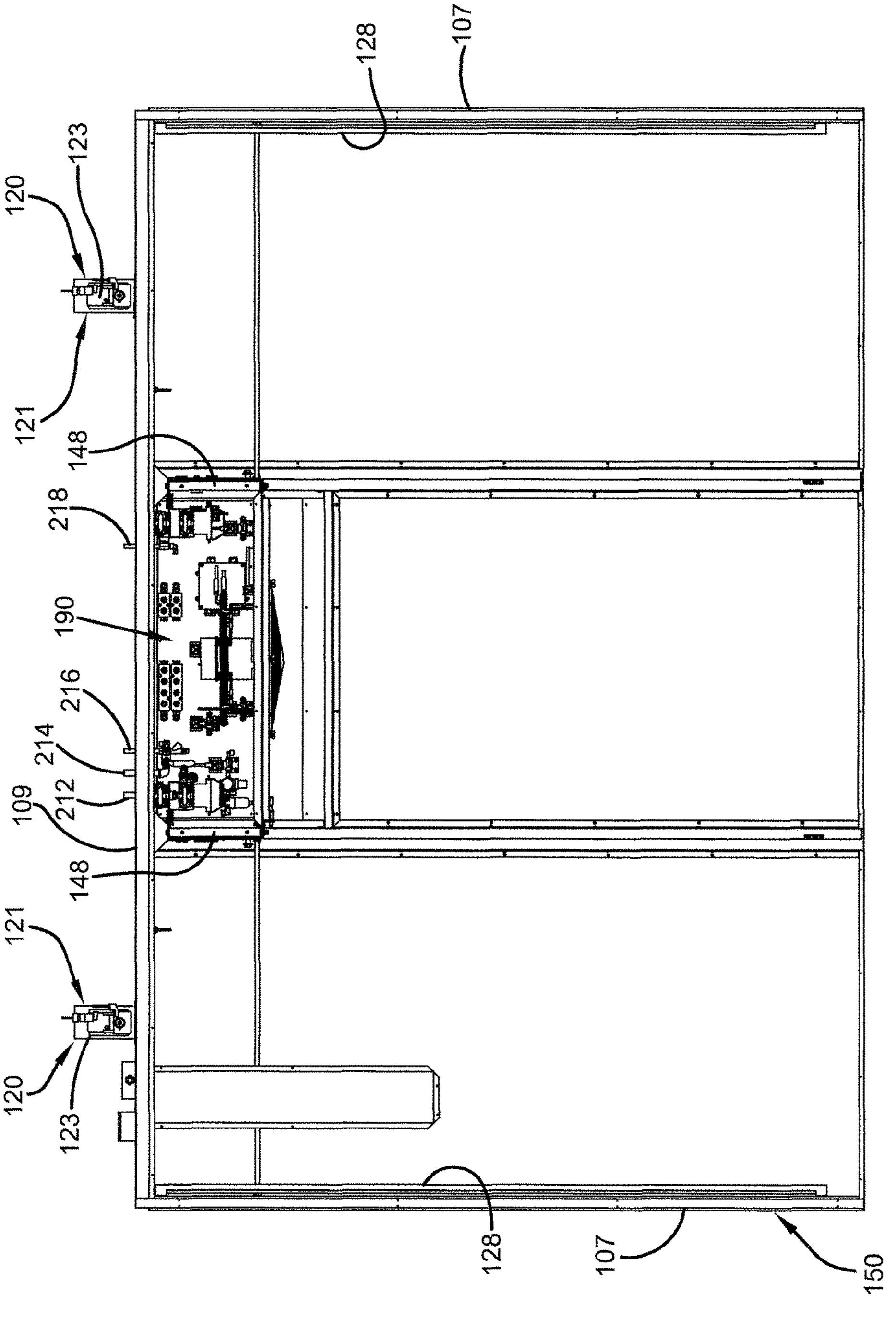
FIG. 10 is a front elevational view of the single-stage incubator taken approximately along line 10-10 in FIG. 5 to show the orientation of components of the single-stage egg incubator conversion kit within the incubator setter.

With reference to FIGS. 3 and 10, multi-functional back plate 190 of single-stage egg incubator conversion kit 102 is mounted to structure of the interior surface of single-stage egg incubator 100 rear wall 106 between pair of main beams 148 of central ventilation duct 140 by any suitable means, such as fasteners (not shown). Multi-functional back plate 190 functions as a secondary control system for high capacity cooling source 180 and high capacity heating source 130 and provides single-stage egg incubator 100 with split cooling control utilizing the high capacity cooling source in conjunction with high capacity air intake system 110, the importance of which will be described in detail below.

Figure 17:
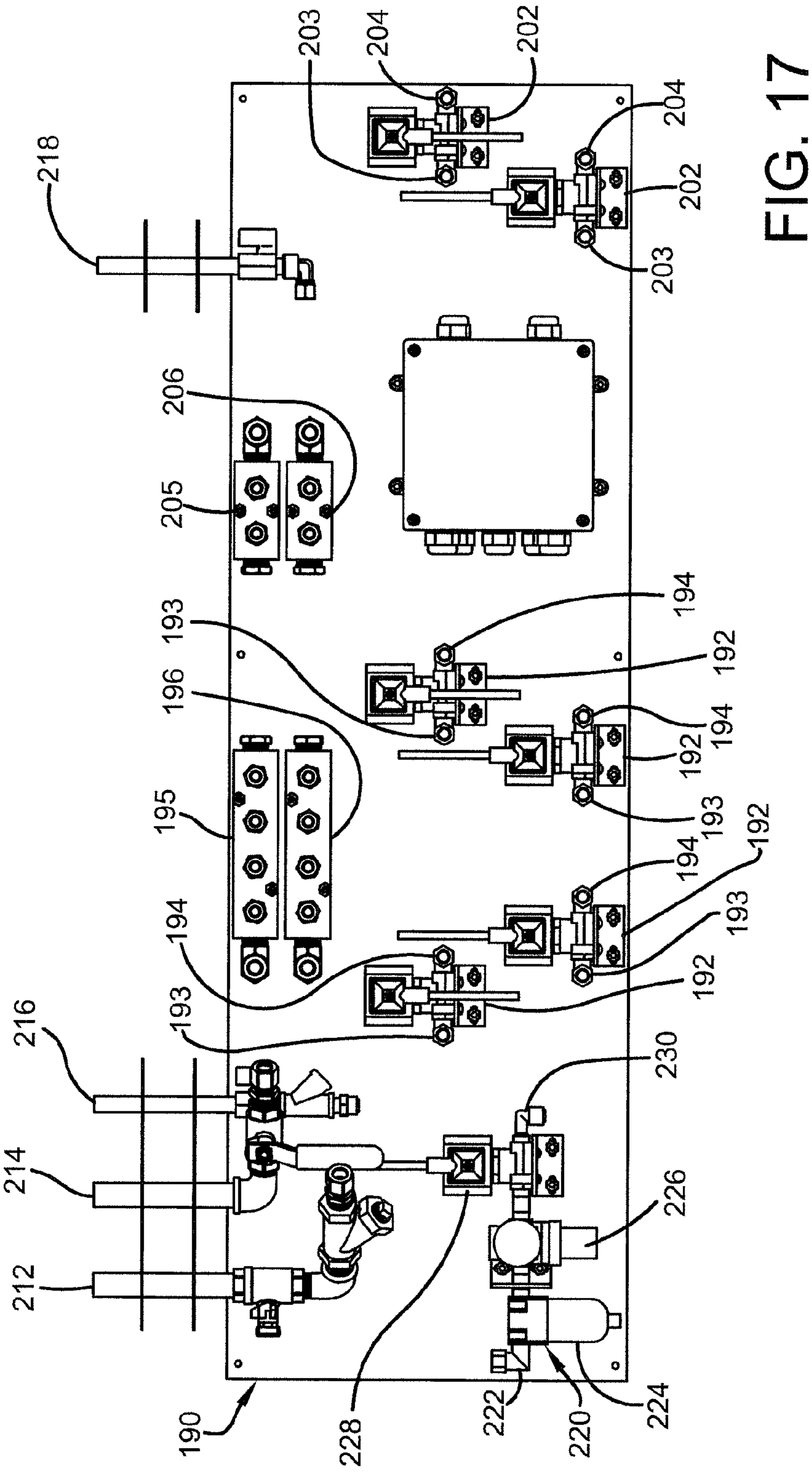
FIG. 17 is an enlarged front elevational view of a multi-functional back plate of the single-stage egg incubator conversion kit of the disclosed subject matter.

With reference to FIG. 17, multi-functional back plate 190 includes a plurality cooling solenoids 192 operatively connected to integrated environmental control system 200, which are utilized to control the flow of cooled water through each pair of cooling coils 182. Each cooling solenoid 192 includes an inlet 193 and an outlet 194. Cooled water flows into setter 150 of single-stage egg incubator 100 via a cooled water influent pipe 212. Cooled water influent pipe 212 is connected to an influent cooled water manifold 195, which splits the cooled water influent pipe into four separate cooled water lines (not shown). Each of the four cooled water lines is connected to a respective inlet 193 of cooling solenoid 192. Each outlet 194 of each cooling solenoid 192 is in turn connected to a respective pair of cooling coils 182 via influent ends 185. Multi-functional back plate 190 includes an effluent cooled water manifold 196. Effluent ends 186 of each pair of cooling coils 182 are connected to effluent cooled water manifold 196 via four effluent cooled water lines (not shown). Effluent cooled water manifold 196 combines the four effluent cooled water lines into a single line, which in turn is connected to a cooled water exhaust pipe 214. Actuation of each cooling solenoid 192 in response to a signal from integrated environmental control system 200 allows an operator to selectively control flow within individual pairs of cooling coils 182. More specifically, each cooling solenoid 192 has a valve (not shown) disposed between inlet 193 and outlet 194. Actuation of the particular cooling solenoid 192 opens the valve and allows the flow of cooled water through the respective pair of cooling coils 182.

In addition, multi-functional back plate 190 includes a plurality heating solenoids 202 operatively connected to integrated environmental control system 200, which are utilized to control the flow of heated water through the finned copper heating pipes when used to provide additional heat capacity to the interior of setter 150. In such circumstances, heated water may flow into setter 150 of single-stage egg incubator 100 via a heated water influent pipe (not shown). The heated water influent pipe is connected to an influent heated water manifold 205, which splits the heated water influent pipe into two separate heated water lines (not shown). Each of the two heated water lines is connected to a respective inlet 203 of a respective heating solenoid 202. Each heating solenoid also includes an outlet 204, which is in turn connected to a respective finned copper heating pipe. Multi-functional back plate includes an effluent heated water manifold 206. The finned copper heating pipes are connected to effluent heated water manifold 206 via two effluent heated water lines (not shown). Effluent heated water manifold 206 combines the two effluent heated water lines into a single line, which is in turn connected to a heated water exhaust pipe (not shown). Actuation of each heating solenoid 202 in response to a signal from integrated environmental control system 200 allows an operator to selectively control flow within individual finned copper heating pipes. More specifically, each heating solenoid 202 has a valve (not shown) disposed between inlet 203 and outlet 204. Actuation of the particular heating solenoid 202 either closes the valve to prevent the flow of heated water through the respective finned copper heating pipe, or opens the valve to allow flow through the heating pipe.

In accordance with an important feature of single-stage egg incubator conversion kit 102, a humidity system 220 is integrated into setter 150. Humidity system 220 is an air over water humidity system and generally includes an air inlet 222, a fluid separator 224, an air pressure regulator 226, and an air solenoid 228 mounted on multi-functional back plate 190. Air inlet 222 is connected to a humidity air influent pipe 218 through which compressed air from an external source flows into setter 150. Air inlet 222 is in turn connected to fluid separator 224. Fluid separator 224 removes liquid, such as oil or water, as air from the compressed air source flows through the fluid separator. Fluid separator 224 is connected to air pressure regulator 228, which in turn is connected to air solenoid 228. Air solenoid 228 is operatively connected to integrated environmental control system 200. Air pressure regulator 228 controls the pressure of compressed air entering into air solenoid 228. Air solenoid 228 includes an air outlet 230, which in turn is connected to at least one venture nozzle (not shown) located within setter 150.

During operation of humidity system 220, water from a source external to setter 150 flows into the setter through a humidity water influent pipe 216, and in turn into a water tank located within setter 150 through a float valve (not shown). The water is allowed to sit within the water tank and warm by means of the setter temperature, preferably to a temperature of about 100 degrees Fahrenheit. As humidity levels within setter 150 drop below a predetermined set level for the particular stage of embryo development, one or more sensors (not shown) mounted within setter 150 communicate a deviation from the predetermined set level to integrated environmental control system 200, which in turn directs a valve (not shown) located within air solenoid 228 to open, allowing pressurized air to flow from air inlet 222 out through air outlet 230 and through the at least one venturi nozzle. As the pressurized air flows through the at least one venturi nozzle within setter 150, warmed water is syphoned out of the water tank and is transferred to the at least one venturi nozzle, to which it is connected by a humidity water line (not shown), and is atomized and released into the interior of setter 150 to increase the humidity within the setter.

With reference to FIGS. 2-5, integrated environmental control system 200 is mounted on front wall 104 of setter 150. Integrated environmental control system 200 is integrated with an environmental monitor/control software programmed into a remote hub (not shown), which allows programmable control of the overall environment within the interior of setter 150 of single-stage egg incubator 100. More specifically, integrated environmental control system 200 is operatively connected to a plurality of electronic environmental sensors (not shown) mounted within the interior of setter 150. The plurality of sensors are capable of communicating environmental conditions, such as temperature, oxygen/carbon dioxide levels, and humidity within setter 150 to integrated environmental control system 200. Because the plurality of environmental sensors are electronic, they eliminate the need for mechanical thermostats, which often contain the hazardous material mercury and are subject to breaking, to monitor the temperature within the internal environment of setter 150.

In accordance with another important aspect of single-stage egg incubator conversion kit 102, and as previously mentioned, integrated environmental control system 200 is also operatively connected to components of multi-functional back plate 190, high capacity air intake system 110, high capacity heating source 130, exhaust/ventilation system 120, and humidity system 220. As data of the particular environmental conditions are transmitted to integrated environmental control system 200 via the plurality of sensors, integrated environmental control system 200 can selectively actuate components of multi-functional back plate 190, high capacity air intake system 110, high capacity heating source 130, exhaust/ventilation system 120, and humidity system 220 to adjust the internal environment of setter 150 to those programmed into the remote hub to achieve the desired environmental conditions for the particular stage of egg development. Alternatively, the desired environmental conditions within setter 150 can also be programmed manually by an operator directly on an interface 201 located on the forward facing surface of integrated environmental control system 200. In addition, integrated environmental control system 200 could be controlled by an operator remotely, such as over the internet.

In accordance with yet another important aspect of single-stage egg incubator conversion kit 102 of the disclosed subject matter, the combination of high capacity heating source 130, high capacity cooling source 180, and high capacity air intake system 110 with multi-functional back plate 190 and integrated environmental control system 200 provides of single-stage egg incubator conversion kit 102 with increased environmental control within setter 150 of single-stage egg incubator 100 over the prior art by providing the ability to heat and/or cool front zone Q1 and rear zone Q2 within the interior of setter 150 independently. More specifically, because high capacity air intake system 110 air intake fan 119 and air intake fan 115, cooling coils 182, fan assemblies 141-146, with associated electric heating coils 168*a*-168*f* and second electric heating coils 167*b* and 167*e*, are independently controllable by the combination of multi-functional back plate 190 and integrated environmental control system 200, independent heating and cooling, in accordance with above, is provided to front zone Q1 and rear zone Q2. The independent heating and cooling of front zone Q1 and rear zone Q2 provides more precise/accurate and responsive temperature control within the interior of setter 150 which minimizes deviation from the selected setter temperature and eliminates competition between high capacity heating source 130 and high capacity cooling source 180, such as that experienced by prior art single-stage and multi-stage incubators.

In addition, a dividing wall (not shown) may be placed within setter 150 to divide the setter into at least two compartments, with the combination of high capacity heating source 130, high capacity cooling source 180, and high capacity air intake system 110 with multi-functional back plate 190 and integrated environmental control system 200 providing independent and separate control of the internal environment within each of the compartments.

The disclosed subject matter also includes a method of converting a multi-stage egg incubator to a single-stage egg incubator with single-stage egg incubator conversion kit 102. Conversion of a multi-stage egg incubator, such as multi-stage egg incubator 10, to single-stage egg incubator 100, is accomplished by closing the existing exhaust ports of the multi-stage egg incubator and incorporating components of exhaust/ventilation system 120 into the multi-stage incubator, removing the existing air intake duct of the multi-stage egg incubator and incorporating components of high capacity air intake system 110 into the multi-stage egg incubator, incorporating high capacity heating source 130 into the existing heating system, removing existing non-finned cooling coils from the multi-stage egg incubator and incorporating high capacity cooling source 180 into the multi-stage egg incubator system, incorporating multi-functional back plate 190 into the multi-stage egg incubator, and removing the existing environmental control system of the multi-stage egg incubator, incorporating components of humidity system 220 into the multi-stage egg incubator, and incorporating integrated environmental control system 200 into the multi-stage egg incubator. The method steps of the disclosed subject matter could be performed in alternative orders without affecting the overall concept of the disclosed subject matter.

It is understood that incorporation of exhaust/ventilation system 120, high capacity air intake system 110, high capacity heating source 130, high capacity cooling source 180, humidity system 220, multi-functional back plate 190, and integrated environmental control system 200 into the multi-stage incubator includes incorporation of their respective components. It is understood that single-stage egg incubator conversion kit 102 of the disclosed subject matter could find application in multi-stage egg incubators having different structures and arrangements of their various components that those shown and described herein, including those utilizing different setter designs, heating and cooling system components, exhaust systems, ventilation systems, and the like. It is further understood that single-stage egg incubator conversion kit 102, and components thereof, could be formed with different structures/components, or of alternative materials, including, aluminum, steel, composites, or other suitable materials, without affecting the overall concept of the invention. It is also understood that single-stage egg incubator conversion kit 102 could include components which provide for increased environmental control within setter 150 additional to those disclosed and described. It is also understood that use of the term "operatively connected" is not meant to be limiting and includes any form of connection, including but not limited to, fiber optics, wire, RF signal, and the like. When reference is made to the term "cooled", it is understood that the temperature is relative to the internal temperature of setter 150. Likewise, when reference is made to the term "heated", it is understood that the temperature is relative to the internal temperature of setter 150.

Accordingly, the single-stage egg incubator conversion kit of the disclosed subject matter is simplified, provides an effective, safe, inexpensive, and efficient structure which achieves all the enumerated objectives, provides for eliminating difficulties encountered with prior art egg incubation systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the disclosed subject matter has been described with reference to a specific embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the single-stage egg incubator conversion kit of the disclosed subject matter is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A method for converting a multi-stage egg incubator to a single-stage egg incubator, the method comprising:

a. closing one or more existing exhaust ports of said multi-stage egg incubator;

b. incorporating an exhaust/ventilation system into the multi-stage incubator;

c. removing an existing air intake duct of said multi-stage egg incubator;

d. incorporating a high capacity air intake system into the multi-stage egg incubator;

e. incorporating a high capacity heating source into an existing heating system within said multi-stage egg incubator;

f. removing one or more existing non-finned cooling coils from said multi-stage egg incubator;

g. incorporating a high capacity cooling source into the multi-stage egg incubator;

h. incorporating a secondary control system into said multi-stage egg incubator;

i. removing an existing environmental control system of said multi-stage egg incubator; and j. incorporating an integrated environmental control system into the multi-stage egg incubator.

2. The method for converting a multi-stage egg incubator to a single-stage egg incubator of claim 1, the method further comprising incorporating a humidity system into the multi-stage egg incubator.

3. The method for converting a multi-stage egg incubator to a single-stage egg incubator of claim 2, wherein said humidity system is operatively connected to said environmental control system, said humidity system maintaining a programmed humidity within an internal environment of a setter of the multi-stage egg incubator.

4. The method for converting a multi-stage egg incubator to a single-stage egg incubator of claim 1, the method further comprising placing a dividing wall into a setter of said multi-stage egg incubator, said dividing wall dividing said setter into at least two compartments, said environmental control system providing independent control of an environment within each of said at least two compartments.

5. The method for converting a multi-stage egg incubator to a single-stage egg incubator of claim 1, wherein said high capacity heating source includes at least two heating coils incorporated into at least one fan assembly.

6. The method for converting a multi-stage egg incubator to a single-stage egg incubator of claim 1, wherein said high capacity cooling source includes four or more pairs of finned cooling coils through which cooled water flows.

7. The method for converting a multi-stage egg incubator to a single-stage egg incubator of claim 6, the method further comprising operatively connecting said secondary control system to said environmental control system to provide selective cooling capacity within an internal environment of a setter of said multi-stage egg incubator by said four or more pairs of finned cooling coils, wherein the secondary control system controls the flow of cooled water through the four or more pairs of finned cooling coils.

8. The method for converting a multi-stage egg incubator to a single-stage egg incubator of claim 1, wherein said high capacity heating source and said high capacity cooling source enable independent temperature control within a front zone and a rear zone of an internal environment of a setter of said multi-stage egg incubator.

9. The method for converting a multi-stage egg incubator to a single-stage egg incubator of claim 1, the method further comprising operatively connecting said high capacity cooling source to said environmental control system and providing selective cooling capacity within an internal environment of a setter of the multi-stage egg incubator.

10. The method for converting a multi-stage egg incubator to a single-stage egg incubator of claim 1, the method further comprising operatively connecting said high capacity heating source to said environmental control system and providing selective heating capacity within an internal environment of a setter of said multi-stage egg incubator.

11. The method for converting a multi-stage egg incubator to a single-stage egg incubator of claim 1, the method further comprising operatively connecting said exhaust/ventilation system to said environmental control system and providing selective air flow between an internal environment of a setter of said multi-stage egg incubator and an external environment of the multi-stage egg incubator at least for controlling a carbon dioxide concentration within said internal environment of said setter.

12. The method for converting a multi-stage egg incubator to a single-stage egg incubator of claim 1, the method further comprising operatively connecting said high capacity air intake system to said environmental control system and providing selective air flow from an external environment of said multi-stage egg incubator into two or more zones within an internal environment of a setter of the multi-stage egg incubator at least for providing cooling to said two or more zones.

* * * * *